United States Patent Office 3,103,538
Patented Sept. 10, 1963

3,103,538
PRODUCTION OF ALCOHOLS
Nikolaus von Kutepow, Karlsruhe-Rueppurr, Hubert Kindler and Karl Eisfeld, Ludwigshafen (Rhine), Karl Dettke, Ludwigshafen (Rhine), Gartenstadt, Helmut Jenne, Schriesheim, Bergstrasse, and Hans Detzer, Ludwigshafen (Rhine), Germany, assignors to Badische Anilin- & Soda-Fabrik Aktiengesellschaft, Ludwigshafen (Rhine), Germany
No Drawing. Filed Sept. 13, 1960, Ser. No. 55,720
Claims priority, application Germany Mar. 15, 1960
1 Claim. (Cl. 260—632)

This invention relates to a process for the production of alcohols by reacting olefines with carbon monoxide and water in the presence of a complex catalyst. More particularly, this invention relates to additives which are useful in improving the effectiveness of the complex catalysts.

It is known from United States Patent No. 2,731,504 that alcohols can be obtained by reacting olefines with a salt of formic acid as a source of carbon monoxide and with water in a so-called carbonylation reaction. This process is accomplished in a neutral or alkaline medium and with the addition of a metal carbonyl, preferably an iron carbonyl, or of a salt of a metal hydrogen carbonyl, preferably a salt of iron hydrogen carbonyl. In an advantageous variation of this process as disclosed in the patent the reaction is carried out in the presence of a tertiary amine such as N-propylpyrrolidine and N-butylpyrrolidine, and the salt of formic acid is partly or completely replaced by carbon monoxide. In the latter case the reaction of ethylene, for example, is represented by the following equation:

(1)     $C_2H_4 + 3CO + 2H_2O \rightarrow C_3H_7OH + 2CO_2$

Alcohols formed in this process contain one carbon atom more than the starting olefines, the said carbon atom being given off by the formic acid or the carbon monoxide.

A useful complex catalyst for the carbonylation process producing alcohols from olefines, carbon monoxide and water is obtained from iron pentacarbonyl, N-n-butylpyrrolidine and water. The complex catalyst is a solid, non-volatile substance similar to graphite. This catalyst may be ascribed the formula:

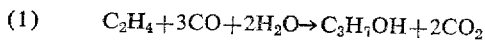

Catalysts of analogous formulae and with similar properties are obtained from other amines, especially tertiary amines, instead of N-n-butylpyrrolidine and from iron tetracarbonyl instead of iron pentacarbonyl. For the production of these catalysts the compounds are in general mixed in any sequence, if desired at a slightly elevated temperature.

The last-mentioned catalysts are the most effective catalysts known for carbonylation processes. They exhibit, however, certain disadvantages. First, alcohols obtained in this process are usually non-unitary, depending on the particular starting olefine. For example, from olefines containing at least 3 carbon atoms and having the double bond at the end of the carbon chain there are predominantly obtained primary alcohols which are unbranched at the carbon atom adjacent to the —CH₂OH or carbinol group, but also primary isomeric branched alcohols, depending on whether the carbinol group enters the olefine molecule at the last or at the last but one carbon atom. Propylene, for example, yields normal butanol (n-butanol) and a smaller amount of iso-butanol:

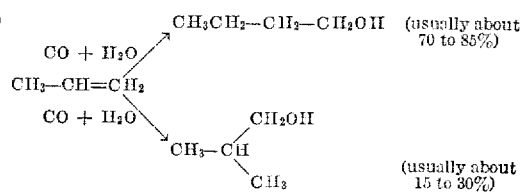

The isomeric butanols can be separated by fractional distillation. As a rule, the normal isomer is the more desirable product because it has superior properties to iso-butanol as a solvent for lacquers. A process for obtaining practically pure normal butanol, therefore, would be desirable.

A more serious disadvantage of the prior art process resides in the fact that the complex catalyst is the more decomposed the higher the carbon monoxide pressure applied. Both the reaction speed and the space-time yield are therefore unsatisfactory. On the one hand, the complex catalyst is decomposed by the action of carbon monoxide, the catalytically inactive iron pentacarbonyl thereby being formed. Iron pentacarbonyl is then found in the gases escaping from the reaction vessel. This is especially marked and detrimental in a continuous process. The amount of iron pentacarbonyl entrained with the gases and consequently the amount of catalyst decomposed increases appreciably as the carbon monoxide pressure is raised. On the other hand, the complex catalyst is destroyed by the action of carbon dioxide furnishing iron carbonate which is precipitated and forms a solid layer on the walls of the reaction vessel. Carbon dioxide is formed in stoichiometric amounts during the reaction as can be seen from Equation 1.

It is an object of the present invention to provide a process for the production of alcohols from olefines, carbon monoxide and water, in which process the decomposition of the complex catalyst is less marked than in the prior art process. Another object of this invention is to provide an improved process for the production of alcohols by reacting olefines with carbon monoxide and water, which yields a larger amount of the valuable alcohols which are unbranched at the carbon atom adjacent to the carbinol group. Yet another object of the invention is to provide an additive modifying the catalyst for the carbonylation of olefines, which allows carrying out the reaction at a higher reaction speed. Other objects of the invention will become apparent hereinafter.

In accordance with the invention it has been found that an improved method for the production of alcohols from olefines, carbon monoxide and water consists in carrying out this carbonylation reaction with a catalyst obtained from an iron carbonyl, an amine and water in the presence of certain additives. Useful additives are ethers, thioethers or carboxylic acid derivatives. The term carboxylic acid derivatives is intended to include nitriles (or cyano compounds), lactams, and lactones.

Surprisingly, all the additives in accordance with the invention improve the stability of the complex catalyst to the action of carbon monoxide and carbon dioxide. The reaction speed of the carbonylation reaction is appreciably increased by the additives in accordance with the invention under otherwise identical conditions. Some of the additives surprisingly cause a remarkable decrease in the formation of the isomeric alcohols which are branched at the carbon atom adjacent to the carbinol group.

It is not known in what way the additives according to the invention affect the carbonylation reaction and produce improved results. It is assumed, however, that the favorable influence is at least partly due to the fact that all the useful compounds contain a hetero or non-carbon atom being more electronegative than carbon and having at least one single electron pair.

The ethers and thioethers which are useful additives in the carbonylation process have the general formula:

$$R_1—X—R_2 \qquad (I)$$

in which X represents oxygen or sulfur, and $R_1$ and $R_2$ represent aliphatic, cycloaliphatic, araliphatic or aromatic radicals, which contain 1 to 12 carbon atoms and which may be substituted by groups which are inert under the conditions of the process. In the preferred additives of general Formula I, $R_1$ and $R_2$ represent alkyl, cycloalkyl, aralkyl and aryl, which substituents contain 1 to 10 carbon atoms and which are substituted by groups which render the compounds added soluble in the reaction mixture, but are inert under the conditions of the process. Such groups include esterified carboxylic groups containing 2 to 8 carbon atoms, etherified hydroxy groups containing 1 to 8 carbon atoms, esterified hydroxy groups containing 1 to 6 carbon atoms, but especially carboxylic groups, hydroxy groups and nitrile groups.

In another group of preferred additives of the general formula I, $R_1$ and $R_2$ represent substituents which, when taken together with X, form a heterocyclic ring with 5 to 8 ring members, which ring may contain one more oxygen, nitrogen or sulfur atom besides X.

Suitable additives of the general Formula I include: diethyl ether, dibutyl ether, diisoamyl ether, 2-ethylhexylmethyl ether, cyclohexylethyl ether, cyclooctylbutyl ether, benzylethyl ether, diphenyl ether, anisol, neroline, dimethyl thioether, cyclohexylethyl thioether, diphenylsulfide, dibenzylsulfide, S-methyl alpha-thionaphthol, butoxy acetic acid, penoxy acetic acid, 2,5-dichlorophenoxy acetic acid, alpha-(orthocresoxy)-propionic acid, beta,beta'-bis-hydroxyethyl ether (diglycol), beta,beta'-bis-hydroxyethyl thioether (thiodiglycol), S-butyl thioglycolic acid, ethylene glycol monoethyl ether, ω,ω'-bis-carboxyethyl sulfide (thiodiglycolic acid), ω,ω'-bis-carboxypropyl sulfide, ω,ω'-bis-carboxy n-amyl sulfide, ω,ω'-bis-carboxy n-heptyl sulfide, butoxy acetic acid methyl ester, bis-beta, beta'-cyanoethyl sulfide, S-beta-phenylethyl thioglycolic acid, S-benzyl-thioglycolic acid, S-ethyl-thioglycolic acid, S-amyl-thioglycolic acid, S-diethyl-thioglycolic acid, tetrahydrofurane, tetrahydrothiophene, morpholine, thiazolidine, dioxane and thiophene carboxylic acid.

Other suitable additives are compounds containing a sulfoxide group, e.g., dimethylsulfoxide or diethylsulfoxide.

Carboxylic acid derivatives which contain the group —C=N and are also useful additives are aliphatic, cycloaliphatic, araliphatic or aromatic nitriles, dinitriles or trinitriles. The preferred compounds of this type of additive contain 2 to 12 carbon atoms. They are saturated in the carbon skeleton and may contain, besides a nitrile group, atoms or groups which are inert under the conditions of the process. These atoms and groups are the same which may also be contained in the additives of the general Formula I.

Some useful additives containing the group —CN that may be given by way of example are: acetonitrile, isobutyronitrile, capronitrile, caprinitrile, succinonitrile, adipic acid dinitrile, suberic acid dinitrile, sebacic acid dinitrile, hexadecane-dinitrile, cyclohexane carboxylic acid nitrile, benzonitrile, acid dinitrile, and benzylcyanide.

Other suitable carboxylic acid derivatives besides the nitriles have the general formula:

$$R_3—CO—Y—R_4 \qquad (II)$$

In this formula, Y represents oxygen or a group $NR_5$, in which $R_5$ represents hydrogen, an aliphatic, cycloaliphatic, araliphatic or aromatic radical, preferably an alkyl radical with 1 to 4 carbon atoms, both hetero atoms being members of a heterocyclic ring having 5 to 13 atoms as ring members. $R_3$ and $R_4$ represent a polymethylene radical with 3 to 11 carbon atoms which together with —CO—Y— form a heterocyclic ring having 5 to 13 ring members. The polymethylene radical may be substituted by a lower alkyl radical having 1 to 4 carbon atoms. All the substituents $R_3$, $R_4$ and $R_5$ may contain atoms or radicals which are inert under the conditions of the process as pointed out in the explanation of the general formula I.

Suitable additives of the general Formula II include: pyrrolidone, caprolactam, caprylic lactam, lauric lactam, N-methylpyrrolidone, N-butylcaprolactam.

Other suitable compounds are N-mono- and N-disubstituted carbonamides, e.g., dimethylformamide, diethylformamide, acetic acid dimethylamide, N,N-diethylbutyramide, and benzoic acid dimethylamide.

It should be noted that the additives may simultaneously contain several of the groups which characterize the class of compounds listed above to which the particular additives belong. Di- and tri-ntriles have already been specifically mentioned. The useful additives may, however, also contain different characteristic groups, such as 2 nitrile groups and 1 thioether group. There should be mentioned for example bis-beta-beta'-cyanoethyl-sulfide, ethylmercapto-acetonitrile. It is furthermore obvious that 2 or more different additives can also be employed simultaneously.

Generally speaking, the additives according to the invention belong to the classes of compounds listed above and contain 2 to 20 carbon atoms. They are saturated in the non-aromatic part of the molecule (i.e., they do not contain carbon-carbon double or triple bonds) and may contain atoms and/or groups being inert under the conditions of the reaction.

The additives according to the invention are added in an amount of 2 to 20% by weight, preferably 4 to 16% by weight, with reference to the total of the 3 components forming the complex catalyst.

The new process is otherwise carried out in the manner basically known in the art. In batchwise operation, for example, the compounds forming the catalyst are placed in any sequence in a pressure-resistant reaction vessel preferably consisting of stainless steel. The preferred iron carbonyl is iron pentacarbonyl, the preferred amines are tertiary amines, in particular N-n-butylpyrrolidine. Iron carbonyl, tertiary amine and water are used in a proportion by weight of 3 to 7:5 to 9:2 to 6. Sometimes it is advantageous to slightly raise the temperature of the mixture in order to promote the formation of the catalyst. A useful temperature is, for example, 20° to 100° C.

The additives according to the invention can be introduced during or after the formation of the catalyst and also during the actual carbonylation reaction. The carbonylation reaction is accomplished by forcing carbon monoxide and the particular olefine into the reaction vessel containing the catalyst. Those olefines containing 2 to 6 carbon atoms and preferably those containing 2 to 4 carbon atoms are recommended. The olefines contain a maximum of 6 and preferably one carbon-carbon double bond.

Carbon monoxide and olefine are introduced in a proportion of 2 to 1:4 to 1. If the olefine is gaseous under normal conditions a mixture of olefine and carbon monoxide can be supplied. Water is required in an amount of at least 2 molecules per molecule of olefine. It may be added during the reaction. It is, however, also possible to use the water for the formation of the catalyst in such an excess that a further addition during the actual carbonylation is unnecessary.

The reaction temperature is between 60° and 130° C., preferably between 90° and 110° C. When coemploying additives according to the invention, carbon monoxide pressures between 1 and 100 atmospheres can be applied without appreciable decomposition of the complex catalyst. The preferred pressures lie between 1 and 40 atmospheres. The total pressure may amount to up to 150 atmospheres.

The reaction mixtures obtained in this way are worked up in the usual manner, as a rule by distillation.

The process can easily be made continuous. In a convenient continuous method, the olefine, carbon monoxide and the catalyst with the additive are simultaneously introduced into a vertical reaction tube. The reaction mixture leaving the top of this tube is separated into a liquid and a gaseous phase. The liquid phase is worked up in the usual manner and the gaseous phase is recycled. Part of the recycled gaseous phase is withdrawn in order to keep the carbon dioxide content at an optimum level of about 15 to 40% by volume with reference to the total gaseous phase.

The process according to the invention is illustrated by the following examples but the invention is not restricted to these examples. In the examples, amounts of gaseous substances are expressed in normal liters (Nl.), i.e., in the volume which these gases would have under standard conditions.

EXAMPLE 1

In a 3-liter pressure-resistant reaction vessel of stainless steel there are placed 250 g. N-butylpyrrolidine, 146 g. of iron pentacarbonyl, 150 g. of water and, as an additive, 15 g. of beta,beta'-dicyanodiethyl sulfide. The air is replaced by nitrogen. A gaseous mixture consisting of 75% by volume of carbon monoxide and 25% by volume of propylene is forced in up to a pressure of 30 atmospheres while the reaction vessel and its contents are still cold. The reaction mixture is then heated to 100° C. The pressure is maintained at 50 atmospheres by forcing in fresh gaseous mixture from time to time until the pressure remains constant. After 6 hours there is no further absorption of gas; the mixture is kept for 3 more hours at 50 atmospheres and then allowed to cool to room temperature.

The pressure of the reaction mixture is released. The escaping gas contains 86.2% by volume of carbon dioxide. 681 g. of liquid reaction mixture are obtained. This mixture is heated with 1200 g. of a 40% sodium hydroxide solution at 100° C. for 2 hours in order to decompose the catalyst. The isomeric butanols are recovered by distillation. 150.5 g. of a mixture of n-butanol and iso-butanol, corresponding to a $C_4$ alcohol content of 22.1% by weight in the liquid reaction mixture, are obtained. According to the refraction index the mixture of the $C_4$ alcohols consists of 86% of n-butanol and 14% of iso-butanol.

The mixture of the osomeric butanols can be separated by distillation in an efficient rectification column.

Similar results are obtained by varying the reaction conditions. The following Table 1 lists the results obtained by working in basically the same manner as described in Example 1. The table also gives modifications of the reaction conditions.

rinsing with nitrogen, a gaseous mixture consisting of 75% by volume of carbon monoxide and 25% by volume of propylene is forced in up to a pressure of 10 atmospheres gage while the reaction vessel and its contents are still cold. The vessel is then heated to 100° C. The pressure is maintained at 20 atmospheres by forcing in gaseous mixture of the above composition as soon as the pressure subsides. When gas absorption comes to a standstill, which is the case when the pressure remains constant for 3 hours after gas supply has been stopped, the vessel is allowed to cool and released of pressure. The product is worked up in a manner analogous to that described in Example 1. 157 g. of $C_4$ alcohols are obtained. The average percentage of butanol is 89%, that of iso-butanol 11%.

By proceeding in an analogous manner, but using different additives, the following average results are obtained:

| Additive | Percentage of n-butanol | Percentage of iso-butanol |
| --- | --- | --- |
| Adipic acid dinitrile | 88 | 12 |
| Succinic acid dinitrile | 89 | 11 |

Experiments carried out without additives gave 80% of n-butanol and 20% of iso-butanol.

The percentage of iso-butanol lies between 4 and 16% when using the following additives: Thiodipropionitrile- (bis-$\beta,\beta'$ - cyanoethyl)-sulfide, ethylmercapto-acetonitrile, tetrahydrothiophene, thiophene carboxylic acid, thiodiglycolic acid (dimethylsulfide-$\alpha,\alpha'$-dicarboxylic acid), diethylsulfide-$\beta,\beta'$-dicarboxylic acid, di-n-amylsulfide-$\omega,\omega'$-dicarboxylic acid, di - n - heptyl-sulfide-$\omega,\omega'$-dicarboxylic acid, S-benzyl-thioglycolic acid, S-$\beta$-phenylethylthioglycolic acid, dibenzyl sulfide, S-ethyl-thioglycolic acid, S-butyl-thioglycolic acid, S-dodecyl-thioglycolic acid, $\beta,\beta$-dihydroxyethylsulfide (thiodiglycol), S,S' - ethylene-bis-thioglycolic acid, acetonitrile, benzonitrile, hexadecane dinitrile, phthalodinitrile, benzyl cyanide, pyrrolidone, caprolactam, caprylic lactam, diglycol, butoxy acetic acid, $\beta$-phenethoxy acetic acid, dioxane.

EXAMPLE 3

3,100 g. of a mixture consisting of 40% of n-butylpyrrolidine, 23% of water, 25% of iron pentacarbonyl and 12% of caprolactam are placed in a 6-liter stirrer-type pressure vessel of corrosion-resistant material. After rinsing with nitrogen, a gaseous mixture consisting of 75% by volume of carbon monoxide and 25% by volume of propylene is forced in up to a pressure of 3 atmospheres gage. The vessel is then heated to 100° C. The pressure is maintained at 7.5 atmospheres gage by forcing in fresh gaseous mixture. The unreacted gaseous

*Table 1*

| Additive | Temperature (° C.) | Reaction time (hours) | Reaction mixture (g.) | Content of $C_4$ alcohols in percent by weight based on the total reaction mixture | N-butanol (Percent by wt. based on $C_4$ alcohol content of the total reaction mixture) | Iso-butanol (Percent by wt. based on $C_4$ alcohol content of the total reaction mixture) | Carbon dioxide in escaping gas (percent by volume) |
| --- | --- | --- | --- | --- | --- | --- | --- |
| 90 g. thiodiglycol | 100 | 7 | 705 | 28.4 | 100 | 0 | 80.0 |
| 90 g. S-butylthio-glycolic acid | 100 | 6 | 654 | 18.5 | 85 | 15 | 75.8 |
| 80 g. butoxy-acetic acid | 100 | 7 | 675 | 24.2 | 85 | 15 | 81.6 |
| 100 g. diglycol | 100 | 8 | 703 | 16.8 | 84 | 16 | 71.2 |
| 90 g. adipic dinitrile | 90 | 7 | 653 | 18.7 | 90 | 10 | 82.2 |
| 80 g. adipic dinitrile | 80 | 6 | 679 | 21.5 | 90 | 10 | 82.0 |
| 80 g. pyrrolidone | 90 | 6 | 676 | 22.3 | 84 | 16 | 84.2 |
|  | 100 | 6 | 595 | 4.82 | 82 | 18 | 8.6 |
|  | 100 | 7 | 590 | 2.84 | 83 | 17 | 3.0 |

EXAMPLE 2

254 g. of N-n-butylpyrrolidine, 150 g. of water, 145 g. of iron pentacarbonyl and 100 g. of thiodiglycol are placed in a 4.5-liter stainless steel pressure vessel. After mixture is withdrawn from the reaction so that the carbon dioxide content is maintained at 20%. On an average, 200 liters per hour (STP) of recycled gas are withdrawn. The gas used up by the reaction and the amount withdrawn in order to maintain the said carbon dioxide level are continuously made up by forcing in fresh gas of the above-specified composition. The experiment is continued until 2,500 liters (S.T.P.) of waste gas have been withdrawn, when the supply of fresh gas is discontinued. The vessel is then allowed to cool and released of pressure. The reaction product is worked up in a manner analogous to that described in Example 1. 1,012 g. of $C_4$ alcohols are obtained. The percentage of n-butanol is about 92%, that of iso-butanol about 8%.

By proceeding in an analogous manner, but using different additives, the results shown in the following table are obtained.

| Additives | Percentage of additive in reaction solution | Percentage of n-butanol | Percentage of iso-butanol |
|---|---|---|---|
| β-Phenylethyl thioglycolic acid | 5 | 92 | 8 |
| Thiodiglycol | 13 | 90 | 10 |
| Pyrrolidone | 9.5 | 92 | 8 |
| Thiodipropionitrile | 5 | 90 | 10 |
| No additive | | 85 | 15 |

EXAMPLE 4

The reaction is carried out continuously in a vertical 3-liter pressure-resistant reaction tube of stainless steel. This tube incorporates a coaxially arranged circulation pipe, inlet pipes for the catalyst and the reacting compounds at the bottom and outlet pipes for withdrawing the reaction mixture at the top of the reaction tube. The said inlet pipes are so arranged that the reaction compounds introduced flow up the circulation pipe and down into the ring-shaped space between circulation pipe and inner surface of the reaction tube.

The reaction tube is charged with 3,000 g. of a mixture consisting of 32% of n-butylpyrrolidine, 46% of iron pentacarbonyl, 12% of pyrrolidone and 10% of water, the percentages being percent by weight. The air in the reaction tube and in the inlet and outlet pipes is replaced by nitrogen and the tube is heated to 100° C.

Into the bottom of the reaction tube there is introduced per hour a mixture consisting of 65 g. of n-butylpyrrolidine, 87.5 g. of iron pentacarbonyl, 34.4 g. of water and 45.6 g. of pyrrolidone. Simultaneously, a gaseous mixture of 75% by volume of carbon monoxide and 25% by volume of propylene is led in. The pressure is 15 atmospheres. An amount of liquid reaction product corresponding to the liquid compounds introduced and to the liquid reaction product formed is withdrawn. The unreacted gaseous compounds are recycled. Part of the recycled gas (200 liters S.T.P. per hour) is continuously withdrawn in order to keep the carbon dioxide content at 20% by volume. This gas is replaced by the same amount of gaseous feed consisting of 75% by volume carbon monoxide and 25% by volume of propylene.

After stationary conditions have been set up the $C_4$ alcohol content in the liquid reaction mixture wtihdrawn from the top of the reaction tube is 20% by weight.

The $C_4$ alcohols consist of 85% of n-butanol and 15% of iso-butanol. The space-time yield in 8 days of continuous operation is 0.45 to 0.50 kg. $C_4$ alcohols per liter of reaction space per day.

Similar results are achieved by carrying out the reaction at a pressure of 20 atmospheres.

There is practically no deposition of iron carbonate even after 14 days of operation if the additives according to the invention are coemployed. Similar results are achieved by using thiodipropionitrile, S-β-phenylethylthioglycolic acid, thiodiglycol, acetonitrite, adipic acid dinitrile, phthalodinitrile, benzylcyanide, pyrrolidone or caprolactam. On the other hand, if the additives are omitted, so much iron carbonate has deposited in the reaction tube after only 5 days that the reaction practically ceases.

A comparison of examples in which additives according to the invention were used with examples carried out in accordance with the prior art process in which no additives are used clearly shows the advantages achieved by the new process. It can be seen that the reaction speed is increased by the additives, larger amounts of $C_4$ alcohols being formed in comparable times (see Table 1). The concentration of carbon dioxide in the waste gas is accordingly much higher than in the prior art process, which indicates a more complete reaction (see Table 1, last column). In Table 1, there is shown as a desirable additional effect that only normal-butanol is formed with thiodiglycol as catalyst. Example 4 shows that the complex catalyst is stabilized by the additives according to the invention, iron carbonate being formed in an appreciable amount if the process is carried out without an additive.

We claim:

In a process for the production of alcohols in which an olefin is reacted with carbon monoxide and water in the presence of a complex catalyst formed from an iron pentacarbonyl, a tertiary amine selected from the group consisting of N-propypyrrolidine and N-butylpyrrolidine, and water, at a temperature of between about 60° C. and 130° C., the improvement which comprises: carrying out the reaction in the presence of from about 2% to about 20% by weight with reference to the total amount of iron carbonyl, tertiary amine, and water forming the complex catalyst of an additive selected from the group consisting of (1) dialkylethers with 1 to 12 carbon atoms in each alkyl and with a carboxylic group as substituent
(2) dialkylethers with 1 to 12 carbon atoms in each alkyl and with two hydroxy groups as substituents
(3) dialkylthioethers with 1 to 12 carbon atoms in each alkyl and with 1 to 2 carboxyl groups as substituents
(4) dialkylthioethers with 1 to 12 carbon atoms in each alkyl and with 2 hydroxy groups as substituents
(5) dialkylthioethers with 1 to 12 carbon atoms in each alkyl and with 1 to 2 cyano groups as substituents
(6) aralkyl-alkyl-thioethers of 1 to 12 carbon atoms in the alkyl and of 7 to 10 carbon atoms in the aralkyl and with a carboxyl group as substituent in the alkyl
(7) aralkyl-alkyl-ether of 1 to 12 carbon atoms in the alkyl and 7 to 10 carbon atoms in the aralkyl and a carboxyl group as substituent in the alkyl
(8) di-aralkyl thioether of 7 to 12 carbon atoms in each aralkyl group
(9) saturated cyclic diethers of from 5 to 8 ring members
(10) saturated cyclic thioether of from 5 to 8 ring members
(11) thiophene carboxylic acid
(12) alkane monocarboxylic acid nitriles of 2 to 12 carbon atoms
(13) benzene carboxylic acid nitriles with 1 to 2 nitrile groups
(14) benzylcyanide
(15) alkane dicarboxylic acid dinitriles of from 2 to 12 carbon atoms, and
(16) lactams of the formula $R_3$—CO—Y—$R_4$ wherein $R_3$ and $R_4$ represent a polymethylene radical with 3 to 11 carbon atoms and Y represents the group —NH—.

References Cited in the file of this patent
UNITED STATES PATENTS
2,911,443    Reed et al. _____ Nov. 3, 1959

UNITED STATES PATENT OFFICE
CERTIFICATE OF CORRECTION

Patent No. 3,103,538            September 10, 1963

Nikolaus von Kutepow et al.

It is hereby certified that error appears in the above numbered patent requiring correction and that the said Letters Patent should read as corrected below.

Column 4, line 17, for "tri-ntriles" read -- tri-nitriles --; columns 5 and 6, Table 1, under the heading "Additive" the column should appear as shown below instead of as in the patent:

80 g. thiodiglycol
                    30 g. S-butylthio-glycolic acid
                    50 g. butoxy-acetic acid
                    100 g. diglycol
                    30 g. adipic dinitrile
                    50 g. adipic dinitrile
                    50 g. pyrrolidone Signed and sealed this 9th day of June 1964.

(SEAL)
Attest:

ERNEST W. SWIDER                  EDWARD J. BRENNER

Attesting Officer                  Commissioner of Patents